US009248569B2

United States Patent
Laurent et al.

(10) Patent No.: US 9,248,569 B2
(45) Date of Patent: Feb. 2, 2016

(54) DISCREPANCY DETECTION APPARATUS AND METHODS FOR MACHINE LEARNING

(71) Applicant: BRAIN CORPORATION, San Diego, CA (US)

(72) Inventors: Patryk Laurent, San Diego, CA (US); Jean-Baptiste Passot, La Jolla, CA (US); Filip Ponulak, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 4 days.

(21) Appl. No.: 14/088,258

(22) Filed: Nov. 22, 2013

(65) Prior Publication Data

US 2015/0148953 A1        May 28, 2015

(51) Int. Cl.
*B25J 9/16* (2006.01)
(52) U.S. Cl.
CPC ...................... *B25J 9/163* (2013.01)
(58) Field of Classification Search
USPC ........ 700/258, 250, 259, 245; 706/15, 14, 16, 706/17, 19, 21, 23, 25, 41; 382/312
See application file for complete search history.

(56) References Cited

U.S. PATENT DOCUMENTS

| 4,468,617 | A | | 8/1984 | Ringwall | |
|---|---|---|---|---|---|
| 4,763,276 | A | * | 8/1988 | Perreirra et al. | 700/262 |
| 4,852,018 | A | * | 7/1989 | Grossberg et al. | 700/259 |
| 5,063,603 | A | | 11/1991 | Burt | |
| 5,092,343 | A | | 3/1992 | Spitzer | |
| 5,245,672 | A | | 9/1993 | Wilson | |
| 5,355,435 | A | | 10/1994 | DeYong | |

(Continued)

FOREIGN PATENT DOCUMENTS

| CN | 102226740 | 10/2011 |
|---|---|---|
| JP | 4087423 | 3/1992 |

(Continued)

OTHER PUBLICATIONS

Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.

(Continued)

*Primary Examiner* — Ronnie Mancho
(74) *Attorney, Agent, or Firm* — Gazdzinski & Associates, PC

(57) ABSTRACT

A robotic device may comprise an adaptive controller configured to learn to predict consequences of robotic device's actions. During training, the controller may receive a copy of the planned and/or executed motor command and sensory information obtained based on the robot's response to the command. The controller may predict sensory outcome based on the command and one or more prior sensory inputs. The predicted sensory outcome may be compared to the actual outcome. Based on a determination that the prediction matches the actual outcome, the training may stop. Upon detecting a discrepancy between the prediction and the actual outcome, the controller may provide a continuation signal configured to indicate that additional training may be utilized. In some classification implementations, the discrepancy signal may be used to indicate occurrence of novel (not yet learned) objects in the sensory input and/or indicate continuation of training to recognize said objects.

20 Claims, 7 Drawing Sheets

(56) References Cited

U.S. PATENT DOCUMENTS

| | | |
|---|---|---|
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A * | 2/1997 | Spoerre et al. ............ 702/179 |
| 5,638,359 A | 6/1997 | Peltola |
| 5,673,367 A | 9/1997 | Buckley |
| 5,719,480 A | 2/1998 | Bock |
| 5,739,811 A | 4/1998 | Rosenberg et al. |
| 5,841,959 A | 11/1998 | Guiremand |
| 5,875,108 A | 2/1999 | Hoffberg |
| 6,009,418 A | 12/1999 | Cooper |
| 6,014,653 A | 1/2000 | Thaler |
| 6,259,988 B1 | 7/2001 | Galkowski et al. |
| 6,363,369 B1 | 3/2002 | Liaw |
| 6,366,293 B1 | 4/2002 | Hamilton |
| 6,442,451 B1 | 8/2002 | Lapham |
| 6,458,157 B1 | 10/2002 | Suaning |
| 6,489,741 B1 | 12/2002 | Genov |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,636,781 B1 | 10/2003 | Shen |
| 6,643,627 B2 | 11/2003 | Liaw |
| 6,697,711 B2 | 2/2004 | Yokono |
| 6,961,060 B1 | 11/2005 | Mochizuki et al. |
| 7,002,585 B1 | 2/2006 | Watanabe |
| 7,024,276 B2 | 4/2006 | Ito |
| 7,324,870 B2 | 1/2008 | Lee |
| 7,342,589 B2 | 3/2008 | Miserocchi |
| 7,395,251 B2 | 7/2008 | Linsker |
| 7,426,501 B2 | 9/2008 | Nugent |
| 7,668,605 B2 | 2/2010 | Braun |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,315,305 B2 | 11/2012 | Petre |
| 8,419,804 B2 | 4/2013 | Herr et al. |
| 8,452,448 B2 | 5/2013 | Pack et al. |
| 8,467,623 B2 | 6/2013 | Izhikevich |
| 8,509,951 B2 | 8/2013 | Glenger |
| 8,639,644 B1 | 1/2014 | Hickman et al. |
| 8,751,042 B2 | 6/2014 | Lee |
| 8,793,205 B1 | 7/2014 | Fisher |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,070,039 B2 | 6/2015 | Richert |
| 2002/0038294 A1 | 3/2002 | Matsugu |
| 2002/0158599 A1 | 10/2002 | Fujita et al. |
| 2002/0169733 A1 | 11/2002 | Peters |
| 2002/0198854 A1 | 12/2002 | Berenji et al. |
| 2003/0023347 A1 | 1/2003 | Konno |
| 2003/0050903 A1 | 3/2003 | Liaw |
| 2003/0144764 A1 | 7/2003 | Yokono et al. |
| 2004/0036437 A1 | 2/2004 | Ito |
| 2004/0051493 A1 | 3/2004 | Furuta |
| 2004/0136439 A1 | 7/2004 | Dewberry |
| 2004/0158358 A1 | 8/2004 | Anezaki et al. |
| 2004/0193670 A1 | 9/2004 | Langan |
| 2005/0004710 A1 | 1/2005 | Shimomura |
| 2005/0015351 A1 | 1/2005 | Nugent |
| 2005/0036649 A1 | 2/2005 | Yokono |
| 2005/0049749 A1 | 3/2005 | Watanabe et al. |
| 2005/0065651 A1 | 3/2005 | Ayers |
| 2005/0069207 A1 * | 3/2005 | Zakrzewski et al. ......... 382/190 |
| 2005/0283450 A1 | 12/2005 | Matsugu |
| 2006/0094001 A1 | 5/2006 | Torre |
| 2006/0161218 A1 | 7/2006 | Danilov |
| 2006/0181236 A1 | 8/2006 | Brogardh |
| 2006/0207419 A1 | 9/2006 | Okazaki et al. |
| 2007/0022068 A1 | 1/2007 | Linsker |
| 2007/0176643 A1 | 8/2007 | Nugent |
| 2007/0208678 A1 | 9/2007 | Matsugu |
| 2007/0260356 A1 | 11/2007 | Kock |
| 2008/0040040 A1 | 2/2008 | Goto et al. |
| 2008/0097644 A1 | 4/2008 | Kaznov |
| 2008/0100482 A1 | 5/2008 | Lazar |
| 2008/0112596 A1 * | 5/2008 | Rhoads et al. ............ 382/115 |
| 2008/0133052 A1 | 6/2008 | Jones |
| 2008/0154428 A1 | 6/2008 | Nagatsuka |
| 2008/0319929 A1 * | 12/2008 | Kaplan et al. ............ 706/14 |
| 2009/0037033 A1 | 2/2009 | Phillips et al. |
| 2009/0043722 A1 | 2/2009 | Nugent |
| 2009/0234501 A1 | 9/2009 | Ishizaki |
| 2009/0287624 A1 | 11/2009 | Rouat |
| 2010/0036457 A1 | 2/2010 | Sarpeshkar |
| 2010/0081958 A1 | 4/2010 | She |
| 2010/0086171 A1 | 4/2010 | Lapstun |
| 2010/0166320 A1 | 7/2010 | Paquier |
| 2010/0169098 A1 | 7/2010 | Patch |
| 2010/0222924 A1 | 9/2010 | Gienger |
| 2010/0225824 A1 | 9/2010 | Lazar |
| 2010/0286824 A1 | 11/2010 | Solomon |
| 2010/0292835 A1 | 11/2010 | Sugiura et al. |
| 2010/0299101 A1 | 11/2010 | Shimada |
| 2010/0312730 A1 * | 12/2010 | Weng et al. ............ 706/15 |
| 2011/0016071 A1 | 1/2011 | Guillen |
| 2011/0026770 A1 | 2/2011 | Brookshire |
| 2011/0035052 A1 | 2/2011 | McLurkin |
| 2011/0060461 A1 | 3/2011 | Velliste et al. |
| 2011/0067479 A1 | 3/2011 | Davis et al. |
| 2011/0119214 A1 | 5/2011 | Breitwisch |
| 2011/0119215 A1 | 5/2011 | Elmegreen |
| 2011/0144802 A1 | 6/2011 | Jang |
| 2011/0158476 A1 | 6/2011 | Fahn et al. |
| 2011/0160906 A1 | 6/2011 | Orita et al. |
| 2011/0196199 A1 | 8/2011 | Donhowe |
| 2011/0231016 A1 | 9/2011 | Goulding |
| 2011/0296944 A1 | 12/2011 | Carter |
| 2012/0011090 A1 | 1/2012 | Tang |
| 2012/0045068 A1 | 2/2012 | Kim et al. |
| 2012/0053728 A1 | 3/2012 | Theodorus |
| 2012/0109866 A1 | 5/2012 | Modha |
| 2012/0143495 A1 | 6/2012 | Dantu |
| 2012/0150781 A1 | 6/2012 | Arthur |
| 2012/0173021 A1 | 7/2012 | Tsusaka |
| 2012/0197439 A1 | 8/2012 | Wang |
| 2012/0209428 A1 | 8/2012 | Mizutani |
| 2012/0209432 A1 | 8/2012 | Fleischer |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0019325 A1 | 1/2013 | Deisseroth |
| 2013/0066468 A1 | 3/2013 | Choi |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 | 4/2013 | Sanders |
| 2013/0116827 A1 | 5/2013 | Inazumi |
| 2013/0151448 A1 | 6/2013 | Ponulak |
| 2013/0151449 A1 | 6/2013 | Ponulak |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297542 A1 | 11/2013 | Piekniewski |
| 2013/0310979 A1 * | 11/2013 | Herr et al. ............ 700/258 |
| 2013/0325244 A1 | 12/2013 | Wang |
| 2013/0325768 A1 | 12/2013 | Sinyavskiy |
| 2013/0325773 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1 | 12/2013 | Petre |

(56) References Cited

U.S. PATENT DOCUMENTS

| | | | |
|---|---|---|---|
| 2014/0012788 | A1 | 1/2014 | Piekniewski |
| 2014/0016858 | A1 | 1/2014 | Richert |
| 2014/0027718 | A1 | 1/2014 | Zhao |
| 2014/0032458 | A1 | 1/2014 | Sinyavskiy et al. |
| 2014/0032459 | A1 | 1/2014 | Sinyavskiy et al. |
| 2014/0052679 | A1 | 2/2014 | Sinyavskiy et al. |
| 2014/0081895 | A1 | 3/2014 | Coenen |
| 2014/0089232 | A1 | 3/2014 | Buibas |
| 2014/0122397 | A1 | 5/2014 | Richert et al. |
| 2014/0122398 | A1 | 5/2014 | Richert |
| 2014/0156574 | A1 | 6/2014 | Piekniewski et al. |
| 2014/0163729 | A1 | 6/2014 | Shi et al. |
| 2014/0222739 | A1 | 8/2014 | Ponulak |
| 2014/0229411 | A1 | 8/2014 | Richert et al. |
| 2014/0244557 | A1 | 8/2014 | Piekniewski et al. |
| 2014/0277718 | A1 | 9/2014 | Izhikevich |
| 2014/0277744 | A1 | 9/2014 | Coenen |
| 2014/0358284 | A1 | 12/2014 | Laurent et al. |
| 2014/0371907 | A1 | 12/2014 | Passot et al. |
| 2014/0371912 | A1 | 12/2014 | Passot et al. |
| 2015/0032258 | A1 | 1/2015 | Passot et al. |
| 2015/0094850 | A1 | 4/2015 | Passot et al. |
| 2015/0094852 | A1 | 4/2015 | Laurent et al. |
| 2015/0127149 | A1 | 5/2015 | Sinyavskiy et al. |
| 2015/0127154 | A1 | 5/2015 | Passot et al. |
| 2015/0127155 | A1 | 5/2015 | Passot et al. |

FOREIGN PATENT DOCUMENTS

| | | |
|---|---|---|
| JP | 2003175480 | 6/2003 |
| RU | 2108612 C1 | 10/1998 |
| WO | 2008083335 | 7/2008 |
| WO | 2010136961 | 12/2010 |
| WO | 2011039542 | 4/2011 |

OTHER PUBLICATIONS

Walters, "Implementation of Self-Organizing Neural Networks for Visuo-Motor Control of an Industrial Robot", IEEE Transactions on Neural Networks, vol. 4, No. 1, Jan. 1993, pp. 86-95.

Froemke et al., "Temporal Modulation of Spike-Timing-Dependent Plasticity", Frontiers in Synaptic Neuroscience, vol. 2, article 19, Jun. 2010, pp. 1-16.

Grollman et al., 2007 "Dogged Learning for Robots" IEEE International Conference on Robotics and Automation (ICRA).

PCT International Search Report for PCT/US2014/040407 dated Oct. 17, 2014.

PCT International Search Report for International Application PCT/US2013/026738 dated Jul. 21, 2014.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_Fl.pdf>.

Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf>.

Kasabov, "Evolving Spiking Neural Networks for Spatio- and Spectro-Temporal Pattern Recognition", IEEE 6th International Conference Intelligent System's 2012 [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.

Lazar et al. "Consistent recovery of sensory stimuli encoded with MIMO neural circuits." Computational intelligence and neuroscience (2009): 2.

Alvarez, 'Review of approximation techniques', PhD thesis, chapter 2, pp. 7-14, University of Bradford, 2000.

Makridakis et al., 'Evaluating Accuracy (or Error) Measures', INSEAD Technical Report, 1995/18/TM.

PCT International Search Report and Written Opinion for PCT/US14/48512 dated Jan. 23, 2015, pp. 1-14.

Abbott et al. (2000), "Synaptic plasticity: taming the beast", Nature Neuroscience, 3, 1178-1183.

Bartlett et al., "Convexity, Classification, and Risk Bounds" Jun. 16, 2005, pp. 1-61.

Bartlett et al., "Large margin classifiers: convex loss, low noise, and convergence rates" Dec. 8, 2003, 8 pgs.

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.

Brette et al., Brain: a simple and flexible simulator for spiking neural networks, The Neuromorphic Engineer, Jul. 1, 2009, pp. 1-4, doi: 10.2417/1200906.1659.

Cessac et al. "Overview of facts and issues about neural coding by spikes." Journal of Physiology, Paris 104.1 (2010): 5.

Cuntz et al., "One Rule to Grow Them All: A General Theory of Neuronal Branching and Its Paractical Application" PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):p. 80.

Dorval et al. "Probability distributions of the logarithm of inter-spike intervals yield accurate entropy estimates from small datasets." Journal of neuroscience methods 173.1 (2008): 129.

Fidjeland et al. "Accelerated Simulation of Spiking Neural Networks Using GPUs" WCCI 2010 IEEE World Congress on Computational lntelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Gewaltig et al., Nest (Neural Simulation Tool), Scholarpedia, 2007, pp. 1-15, 2( 4 ): 1430, doi: 1 0.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al. "Rapid neural coding in the retina with relative spike latencies." Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, "Polychronization: Computation with Spikes", Neural Computation, 25, 2006, 18, 245-282.

Izhikevich et al., "Relating STDP to BCM", Neural Computation (2003) 15, 1511-1523.

Izhikevich, "Simple Model of Spiking Neurons", IEEE Transactions on Neural Networks, vol. 14, No. 6, Nov. 2003, pp. 1569-1572.

Jin et al. (2010) "Implementing Spike-Timing-Dependent Plasticity on SpiNNaker Neuromorphic Hardware", WCCI 2010, IEEE World Congress on Computational Intelligence.

Karbowski et al., "Multispikes and Synchronization in a Large Neural Network with Temporal Delays", Neural Computation 12, 1573-1606 (2000)).

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

(56) References Cited

OTHER PUBLICATIONS

Laurent, "The Neural Network Query Language (NNQL) Reference" [retrieved on Nov. 12, 2013]. Retrieved from the Internet: <URL https://code.google.com/p/nnql/issues/detail?id=1>.

Laurent, "Issue 1—nnql—Refactor Nucleus into its own file—Neural Network Query Language" [retrieved on Nov. 12, 2013]. Retrieved from the Internet: <URL:https:1/code.google.com/p/nnql/issues/detail?id=1 >.

Lazar et al. "A video time encoding machine", in Proceedings of the 15th IEEE International Conference on Image Processing (ICIP '08}, 2008, pp. 717-720.

Lazar et al. "Consistent recovery of sensory stimuli encoded with MIMO neural circuits." Computational intelligence and neuroscience (2010): 2.

Lazar et al. "Multichannel time encoding with integrate-and-fire neurons." Neurocomputing 65 (2005): 401-407.

Masquelier, Timothee. "Relative spike time coding and STOP-based orientation selectivity in the early visual system in natural continuous and saccadic vision: a computational model." Journal of computational neuroscience 32.3 (2012): 425-441.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Sato et al., "Pulse interval and width modulation for video transmission." Cable Television, IEEE Transactions on 4 (1978): 165-173.

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.

Wang "The time dimension for scene analysis." Neural Networks, IEEE Transactions on 16.6 (2005): 1401-1426.

Sjostrom et al., "Spike-Timing Dependent Plasticity" Scholarpedia, 5(2):1362 (2010), pp. 1-18.

Chung Hyuk Park, et al., Transfer of Skills between Human Operators through Haptic Training with Robot Coordination. International Conference on Robotics and Automation Anchorage Convention District, 2010, Anchorage, Alaska, USA, pp. 229-235 [Online] [retrieved 12.3.2015]. Retrieved from Internet: <URL:https://smartech.gatech.edu/bitstream/handle/1853/38279/1EE_2010_ICRA 002.pdf>.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098, 2 pgs.

http://www.braincorporation.com/specs/BStem_SpecSheet_Rev_Nov11_2013.pdf.

Specification, figures and EFS receipt of U.S. Appl. No. 14/265,113, filed Apr. 29, 2014 and entitled "Trainable convolutional network apparatus and methods for operating a robotic vehicle" (71 pages).

Specification, figures and EFS receipt of U.S. Appl. No. 14/285,385, filed May 22, 2014 and entitled "Apparatus and methods for real time estimation of differential motion in live video" (42 pages).

Specification, figures and EFS receipt of U.S. Appl. No. 14/285,414, filed May 22, 2014 and entitled "Apparatus and methods for distance estimation using multiple image sensors" (63 pages).

Specification, figures and EFS receipt of U.S. Appl. No. 14/285,466, filed May 22, 2014 and entitled "Apparatus and methods for robotic operation using video imagery" (64 pages).

Specification, figures and EFS receipt of U.S. Appl. No. 14/321,736, filed Jul. 1, 2014 and entitled "Optical detection apparatus and methods" (49 pages).

Specification, figures and EFS receipt of U.S. Appl. No. 14/326,374, filed Jul. 8, 2014 and entitled "Apparatus and methods for distance estimation using stereo imagery" (75 pages).

Specification, figures and EFS receipt of U.S. Appl. No. 14/489,242, filed Sep. 17, 2014 and entitled "Apparatus and methods for remotely controlling robotic devices" (100 pages).

Specification, figures and EFS receipt of U.S. Appl. No. 14/542,391, filed Nov. 14, 2014 and entitled "Feature detection apparatus and methods for training of robotic navigation" (83 pages).

Specification, figures and EFS receipt of U.S. Appl. No. 14/637,138, filed Mar. 3, 2015 and entitled "Salient features tracking apparatus and methods using visual initialization" (66 pages).

Specification, figures and EFS receipt of U.S. Appl. No. 14/637,164, filed Mar. 3, 2015 and entitled "Apparatus and methods for tracking salient features" (66 pages).

Specification, figures and EFS receipt of U.S. Appl. No. 14/637,191, filed Mar. 3, 2015 and entitled "Apparatus and methods for saliency detection based on color occurrence analysis" (66 pages).

Specification, figures and EFS receipt of U.S. Appl. No. 14/244,888, filed Apr. 3, 2014 and entitled "Learning apparatus and methods for control of robotic devices via spoofing". (100 pages).

Specification, figures and EFS receipt of U.S. Appl. No. 14/244,890, filed Apr. 3, 2014 and entitled "Apparatus and methods for remotely controlling robotic devices" (91 pages).

Specification, figures and EFS receipt of U.S. Appl. No. 14/244,892, filed Apr. 3, 2014 and entitled "Spoofing remote control apparatus and methods" (95 pages).

Specification, figures and EFS receipt of U.S. Appl. No. 14/588,168, filed Dec. 31, 2014 and entitled "Apparatus and methods for training robots" (101 pages).

Specification, figures and EFS receipt of U.S. Appl. No. 14/705,487, filed May 6, 2015 and entitled "Persistent predictor apparatus and methods for task switching" (119 pages).

\* cited by examiner

DISCREPANCY DETECTION APPARATUS AND METHODS FOR MACHINE LEARNING

CROSS-REFERENCE TO RELATED APPLICATIONS

This application is related to co-pending and co-owned U.S. patent application Ser. No. 14/040,520, entitled "APPARATUS AND METHODS FOR TRAINING OF ROBOTIC CONTROL ARBITRATION", filed Sep. 27, 2013; U.S. patent application Ser. No. 14/040,498, entitled "ROBOTIC CONTROL ARBITRATION APPARATUS AND METHODS", filed Sep. 27, 2013; U.S. patent application Ser. No. 13/953,595 entitled "APPARATUS AND METHODS FOR TRAINING AND CONTROL OF ROBOTIC DEVICES", filed Jul. 29, 2013; U.S. patent application Ser. No. 13/918,338 entitled "ROBOTIC TRAINING APPARATUS AND METHODS", filed Jun. 14, 2013; U.S. patent application Ser. No. 13/918,298 entitled "HIERARCHICAL ROBOTIC CONTROLLER APPARATUS AND METHODS", filed Jun. 14, 2013; U.S. patent application Ser. No. 13/918,620 entitled "PREDICTIVE ROBOTIC CONTROLLER APPARATUS AND METHODS", filed Jun. 14, 2013; U.S. patent application Ser. No. 13/907,734 entitled "ADAPTIVE ROBOTIC INTERFACE APPARATUS AND METHODS", filed May 31, 2013; U.S. patent application Ser. No. 13/842,530 entitled "ADAPTIVE PREDICTOR APPARATUS AND METHODS", filed Mar. 15, 2013; U.S. patent application Ser. No. 13/842,562 entitled "ADAPTIVE PREDICTOR APPARATUS AND METHODS FOR ROBOTIC CONTROL", filed Mar. 15, 2013; U.S. patent application Ser. No. 13/842,616 entitled "ROBOTIC APPARATUS AND METHODS FOR DEVELOPING A HIERARCHY OF MOTOR PRIMITIVES", filed Mar. 15, 2013; U.S. patent application Ser. No. 13/842,647 entitled "MULTICHANNEL ROBOTIC CONTROLLER APPARATUS AND METHODS", filed Mar. 15, 2013; and U.S. patent application Ser. No. 13/842,583 entitled "APPARATUS AND METHODS FOR TRAINING OF ROBOTIC DEVICES", filed Mar. 15, 2013; each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to training of learning devices.

2. Background

Robotic devices may be used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots may learn to operate via exploration.

Programming robots may be costly and remote control may require a human operator. Furthermore, changes in the robot model and/or environment may require changes in the programming code of the robot.

SUMMARY

One aspect of the disclosure relates to a robotic apparatus. The robotic apparatus may comprise a platform, a sensor module, and a controller. The platform may comprise a controllable actuator. The sensor module may be configured to provide environmental information associated with an environment of the platform. The controller may be configured to: provide a control instruction for the actuator, the control instruction configured to cause the platform to execute an action to accomplish a target task in accordance with the environmental information; determine a predicted outcome of the action; determine a discrepancy signal based on an actual outcome of the action and the predicted outcome; and determine a repeat indication responsive to the discrepancy being within a range of a target value associated with the target task. The repeat indication may be configured to cause the robot to execute a second action to achieve the target task.

In some implementations, the target task may be associated with an object within the environment. The environmental information may comprise sensory input characterizing one or more of a size, position, shape, or color of the object.

In some implementations, the predicted and the actual outcome may comprise a characteristic of at least one of the platform and the environment. The actual outcome may be determined based on an output of the sensory module obtained subsequent to the execution of the action.

In some implementations, the characteristic may be selected from a group consisting of a position of the platform, a position of an object within the environment, and a distance measure between the object and the platform.

In some implementations, the characteristic may comprise a parameter associated with the controllable actuator, the parameter being selected from a group consisting of actuator displacement, torque, force, rotation rate, and current draw.

Another aspect of the disclosure relates to a method of training an adaptive robotic apparatus. The method may comprise: for a given trial: causing the apparatus to execute an action based on a context; determining a current discrepancy between a target outcome of the action and a predicted outcome of the action; comparing the current discrepancy to a prior discrepancy, the prior discrepancy being determined based on a prior observed outcome of the action and a prior predicted outcome of the action determined at a prior trial; and providing an indication responsive to the current discrepancy being smaller than the prior discrepancy, the indication being configured to cause the apparatus to execute the action based on the context during a trial subsequent to the given trial.

In some implementations, the discrepancy may be configured based on a difference between the actual outcome and the predicted outcome. A repeat indication may be determined based on the discrepancy being greater than zero.

In some implementations, the controller may be configured to determine a stop indication based on the discrepancy no greater than zero, the stop indication being configured to cause the robot to execute another task.

In some implementations, the determination of the current discrepancy may be effectuated by a supervised learning process based on a teaching input. The teaching input may comprise the target outcome.

In some implementations, the context may be determined at a first time instance associated with the given trial. The predicted outcome of the action may be determined based on a delayed context obtained during another trial at a second time instance prior to the first time instance.

Yet another aspect of the disclosure relates to a non-transitory computer-readable storage medium having instructions embodied thereon. The instructions may be executable by one or more processors to perform a method of adapting training of a learning apparatus. The method may comprise: determining a discrepancy between a predicted outcome and an observed outcome of an action of the learning apparatus; determining an expected error associated with the discrepancy determination; comparing the expected error to a target error associated with the discrepancy determination; and providing a continue-training indication based on the expected error being smaller than the target error.

In some implementations, the observed outcome may be associated with execution of the action during a trial at first time instance. The continue-training indication may be configured to cause execution of the action at another trial at a second time instance subsequent to the first time instance.

In some implementations, the discrepancy determination may be effectuated based on a first supervised learning process configured based on a first teaching input. The first teaching input may be configured to convey information related to the observed outcome of the action.

In some implementations, the expected error determination may be effectuated based on a second supervised learning process configured based on a second teaching input. The second teaching input may be configured to convey information related to the target error.

In some implementations, the target error may be determined based on one or more trials preceding the trial. The method may comprise providing a cease-training indication based on the expected error being greater or equal the target error.

In some implementations, the action execution during the other trial may be characterized by another expected error determination. The method may comprise: adjusting the target error based on the comparison of the expected error to the target error. The adjusted target error may be configured to be compared against the another expected error during the another trial.

In some implementations, the execution of the action at the first time instance may be configured based on output of a random number generator. The method may comprise: determining one or more target error components associated with the one or more preceding trials; and determining the target error based on a weighted sum of one or more target error components.

In some implementations, the first learning process may be configured based on a neuron network comprising a plurality of neurons communicating via a plurality of connections. Individual connections may provide an input into a given neuron. The plurality of neurons may be characterized by a connection efficacy configured to affect operation of the given neuron. The determination of the discrepancy may comprise adjusting the efficacy of one or more connections based on the first teaching signal.

In some implementations, the action may be configured based on a sensory context. The first learning process may be configured based on a look-up table. The look-up table may comprise one or more entries. Individual entries corresponding to occurrence of context, the action, and the predicted outcome. The association development may comprise adjusting at least one of the one or more entries the based on the first teaching signal.

In some implementations, the action may be configured based on a sensory context. The storage medium may be embodied in a controller apparatus of a robot. Responsive to the sensory context comprising a representation of an obstacle, the action may comprise an avoidance maneuver executed by the robot. Responsive to the sensory context comprising a representation of a target, the action may comprise an approach maneuver executed by the robot.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
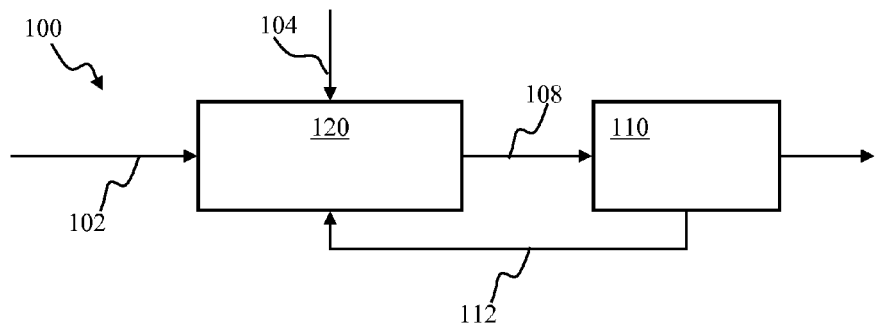
FIG. 1 is a block diagram illustrating a robotic apparatus, according to one or more implementations.

All Figures disclosed herein are ©Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1 illustrates one implementation of an adaptive robotic apparatus for use with learning methodologies including the ones described hereinafter. The apparatus 100 of FIG. 1 may comprise an adaptive controller 120 and a robotic platform 110. The controller 120 may be configured to provide control output 108 for the robotic platform 110. The output 108 may comprise one or more motor commands (e.g., pan camera to the right), sensor acquisition parameters (e.g., use high resolution camera mode), commands to actuators on the robot (e.g., wheels, arms, and/or other actuators), and/or other parameters. The output 108 may be configured by the controller 120 based on one or more sensory inputs 102. The input 102 may comprise data used for solving a particular task. In one or more implementations, such as those involving a robotic arm or autonomous robot, the signal 102 may comprise a stream of raw sensor data and/or preprocessed data. Raw sensor data may include data conveying information associated with one or more of proximity, inertial terrain imaging, and/or other information. Preprocessed data may include data conveying information associated with one or more of velocity, information extracted from accelerometers, distance to obstacle, positions, and/or other information.

In one or more implementations, such as object recognition, and/or obstacle avoidance, the input 102 may comprise a stream of pixel values associated with one or more digital images. In one or more implementations of sensing (e.g., video, radar, sonography, x-ray, magnetic resonance imaging, and/or other types of sensing), the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a given frame rate (e.g., a 25 Hz frame rate and/or other frame rate). It will be appreciated by those skilled in the arts that the above image parameters are merely exemplary, and many other image representations (e.g., bitmap, CMYK, HSV, HSL, grayscale, and/or other representations) and/or frame rates are equally useful with the present invention. Pixels and/or groups of pixels associated with objects and/or features in the input frames may be encoded using, for example, latency encoding described in co-owned U.S. patent application Ser. No. 12/869,583, filed Aug. 26, 2010 and entitled "INVARIANT PULSE LATENCY CODING SYSTEMS AND METHODS", patented as U.S. Pat. No. 8,467,623 on Jun. 18, 2013; co-owned U.S. Pat. No. 8,315,305, issued Nov. 20, 2012, entitled "SYSTEMS AND METHODS FOR INVARIANT PULSE LATENCY CODING"; co-owned and co-pending U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described co-owned U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", patented as U.S. Pat. No. 9,070,039 on Jun. 30, 2015, each of the foregoing being incorporated herein by reference in its entirety.

In some implementations, the signal 102 may comprise a stream of preprocessed sensor data. Preprocessed data may convey information associated with one or more of velocity, information extracted from accelerometers, distance to obstacle, position, one or more of levels of activations of Gabor filters for face recognition, contours, and/or other information. In one or more implementations, the input signal 102 may comprise a target motion trajectory. The motion trajectory may be used to predict a future state of the robot on the basis of a current state and the target state. In one or more implementations, the signals in FIG. 1 may be encoded as spikes.

The controller 120 may be operable in accordance with a learning process (e.g., reinforcement learning and/or supervised learning). In one or more implementations, the controller 120 may optimize performance (e.g., performance of the system 100 of FIG. 1) by minimizing average value of a performance function as described in detail in co-owned and co-pending U.S. patent application Ser. No. 13/487,533, filed Jun. 4, 2012 and entitled "SYSTEMS AND APPARATUS FOR IMPLEMENTING TASK-SPECIFIC LEARNING USING SPIKING NEURONS", incorporated herein by reference in its entirety.

A learning process of an adaptive controller (e.g., 120 of FIG. 1) may be implemented using a variety of methodologies. In some implementations, the controller 120 may comprise an artificial neuron network (e.g., the spiking neuron network described in co-owned and co-pending U.S. patent application Ser. No. 13/487,533, entitled "SYSTEMS AND APPARATUS FOR IMPLEMENTING TASK-SPECIFIC LEARNING USING SPIKING NEURONS", filed Jun. 4, 2012, incorporated supra) configured to control robotic platforms (e.g., a robotic rover).

Individual spiking neurons may be characterized by internal state q. The internal state q may, for example, comprise a membrane voltage of the neuron, conductance of the membrane, and/or other parameters. The neuron process may be characterized by one or more learning parameter which may comprise input connection efficacy, output connection efficacy, training input connection efficacy, response provision (firing) threshold, resting potential of the neuron, and/or other parameters. In one or more implementations, some learning parameters may comprise probabilities of signal transmission between the units (e.g., neurons) of the network.

In some implementations, the training input (e.g., 104 in FIG. 1) may be differentiated from sensory inputs (e.g., inputs 102) as follows. During learning, data (e.g., spike events) arriving at neurons of the network via input 102 may cause changes in the neuron state (e.g., increase neuron membrane potential and/or other parameters). Changes in the neuron state may cause the neuron to provide a response (e.g., output a spike). Teaching data arriving to neurons of the network may cause (i) changes in the neuron dynamic model (e.g., modify parameters a,b,c,d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning), data (e.g., spike events) arriving at neurons of the network may cause changes in the neuron state (e.g., increase neuron membrane potential and/or other parameters). Changes in the neuron state may cause the neuron to provide a response (e.g., output a spike). Teaching data may be absent during operation, while input data are required for the neuron to provide output.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012 and patented as U.S. Pat. No. 9,047,568 on Jun. 2, 2015, the foregoing being incorporated herein by reference in its entirety.

In some implementations, analog inputs may be converted into spikes using, for example, kernel expansion techniques described in co-owned and co-pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned and co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned and co-pending U.S. patent application Ser. No. 13/488,106, entitled "SPIKING NEURON NETWORK APPARATUS AND METHODS", filed Jun. 4, 2012; conditional plasticity rules described in co-owned and co-pending U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in co-owned and co-pending U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, and patented as U.S. Pat. No. 8,972,315 on Mar. 3, 2015; co-owned and co-pending U.S. patent application Ser. No. 13/660,945, entitled "MODULATED PLASTICITY APPARATUS AND METHODS FOR SPIKING NEURON NETWORKS", filed Oct. 25, 2012; co-pending U.S. patent application Ser. No. 13/774,934, entitled "APPARATUS AND METHODS FOR RATE-MODULATED PLASTICITY IN A SPIKING NEURON NETWORK", filed Feb. 22, 2013; and multi-modal rules described in co-pending U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response provision by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updates may be effectuated using a variety of applicable methodologies such as, for example, event based updates described in detail in co-pending U.S. patent application Ser. No. 13/239,255, filed Sep. 21, 2011, entitled "APPARATUS AND METHODS FOR SYNAPTIC UPDATE IN A PULSE-CODED NETWORK"; co-pending U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and co-pending U.S. patent application Ser. No. 13/560,891, filed Jul. 27, 2012 and entitled "APPARATUS AND METHODS FOR EFFICIENT UPDATES IN SPIKING NEURON NETWORKS", each of the foregoing being incorporated herein by reference in its entirety.

A neuron process may comprise one or more learning rules configured to adjust neuron state and/or provide neuron output in accordance with neuron inputs. In some implementations, the one or more learning rules may comprise state dependent learning rules described, for example, in co-owned and co-pending U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012 and/or co-owned and co-pending U.S. patent application Ser. No. 13/722,769, filed Dec. 20, 2012, and entitled "APPARATUS AND METHODS FOR STATE-DEPENDENT LEARNING IN SPIKING NEURON NETWORKS", each of the foregoing being incorporated herein by reference in its entirety. In one or more implementations, the one or more learning rules may be configured to comprise one or more reinforcement learning, unsupervised learning, and/or supervised learning as described in co-owned and co-pending U.S. patent application Ser. No. 13/487,499 filed Jun. 4, 2012 and entitled "STOCHASTIC APPARATUS AND METHODS FOR IMPLEMENTING GENERALIZED LEARNING RULES", incorporated supra. In one or more implementations, the one or more learning rules may be configured in accordance with focused exploration rules such as described, for example, in co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, patented as U.S. Pat. No. 8,943,008 on Jan. 27, 2015, the foregoing being incorporated herein by reference in its entirety.

An adaptive controller (e.g., the controller apparatus 120 of FIG. 1) may comprise an adaptable predictor block configured to, inter alia, learn to predict the outcomes associated with one or more control actions (e.g., due to provision of the control signal 108 to the platform 110). In one or more implementations, the outcomes may comprise one or more of motion of the platform in response to the control command (e.g., rotate motor forward with 0.5 A current), apparent motion of an object due to platform motion (e.g., motion of objects when panning a lens), response of an object due to a squeezing and/or bumping action by a manipulator arm, and/or other physical object. In some implementations, the association between robot's action and sensory outcome may be learned based on random exploration, wherein a given action is executed at random and the resultant sensory input is analyzed. In some implementations, the association between robot's action and sensory outcome may be based on repeating a given action multiple times and training the adaptive predictor to predict the sensory outcome. During training, the controller may receive a copy of the planned and/or executed motor command and sensory information obtained based on the robot's response to the command. The controller may predict sensory outcome based on the command and one or more prior sensory inputs. The predicted sensory outcome may be compared to the actual outcome. Based on a determination that the prediction matches the actual outcome, the training may stop. Upon detecting a discrepancy between the prediction and the actual outcome, the controller may provide a continuation signal configured to indicate that additional training may be utilized. In some classification implementations, the discrepancy signal may be used to indicate occurrence of novel (not yet learned) objects in the sensory input and/or indicate continuation of training to recognize said objects.

Figure 2:
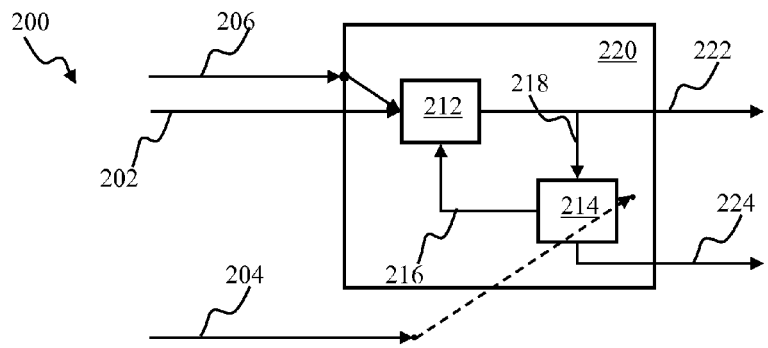
FIG. 2 is a block diagram illustrating an adaptive system configured to learn novelty in sensory input, according to one or more implementations.
Figure 3A:
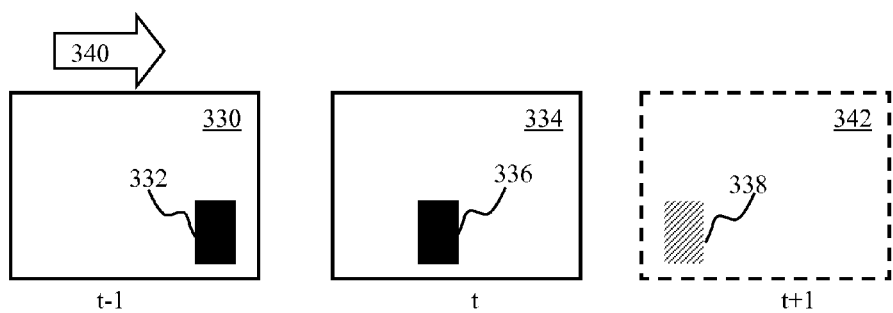
FIG. 3A is a graphical illustration of sensory input prediction by, e.g., an adaptive apparatus of FIG. 2, in accordance with one or more implementations.
Figure 3B:
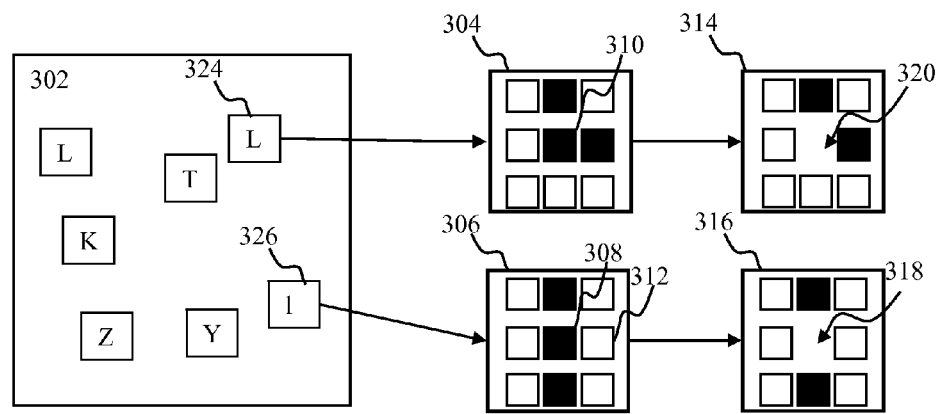
FIG. 3B is a graphical illustration of exemplary frames of pixels depicting object appearance as a function of distance, according to one or more implementations.
Figure 4:
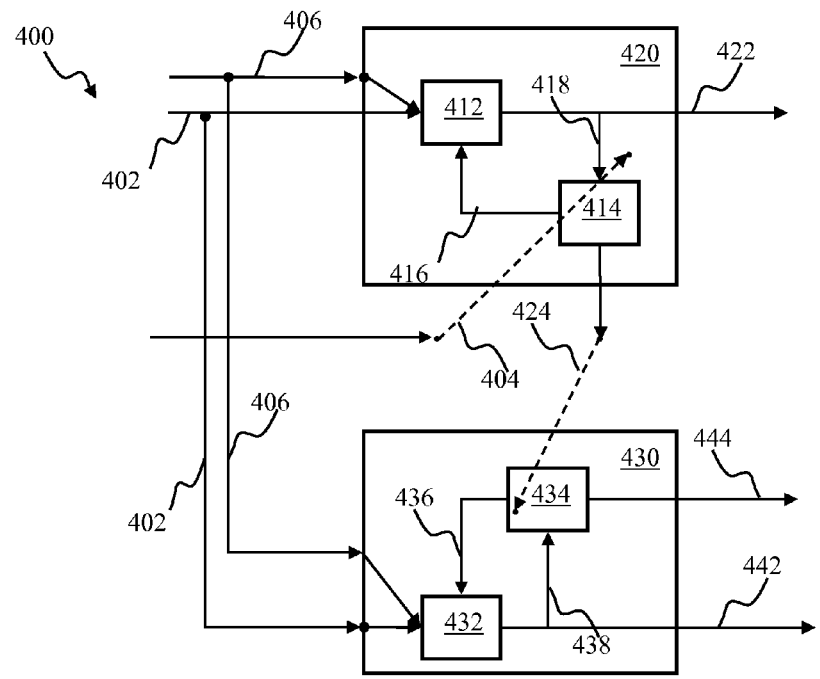
FIG. 4 is a block diagram illustrating an adaptive system configured to learn a prediction error in sensory input, according to one or more implementations.

FIGS. 2-4 illustrate implementations of exemplary adaptive apparatus configured to learn sensory consequences of an action and/or detect objects in sensory input. The apparatus 200 may be embodied within the robotic controller 120 in FIG. 1. The apparatus 200 may comprise an adaptive module (e.g., predictor apparatus 220) configured to receive sensory input 202, an action indication 206, a teaching input 204, and/or other information. In one or more implementations, the sensory input 202 may comprise data used for solving a particular task (e.g., the input 102 described above in connection with FIG. 1). The action indication may comprise one or more of a motor command (e.g., rotate right wheel motor actuator by a given amount and/or at a given rate), a movement instruction (e.g., move forward, turn left, approach), and/or other action indications.

The predictor apparatus 220 may be configured to determine an association C between a previously executed action due to the action indication 206 occurring at time t−1 and current sensory input at time t, as follows:

$$C(x(t-1), x(t), m(t-1))$$ (Eqn. 1)

where the m(t−1) denotes the action indication at time (t−1), and x(t−1), x(t) denote the sensory input at time (t−1) and the current time t.

The predictor apparatus 220 may comprise a forward model block 212 and an evaluation block 214. The forward model block 212 may produce a prediction of the sensory input that should occur at time (t+1) based on the action indication at time (t−1), and x(t−1), x(t) denote the sensory input at time (t−1) and the current time.

FIG. 3A illustrates an exemplary sensory input prediction, in accordance with one or more implementations. Frames 330, 334, 342 in FIG. 3A may correspond to frames of pixels obtained, e.g., by a camera 1166 of the robotic rover 1160 in FIG. 9, at time instances t−1, t, t+1, respectively. The frame 334 observed at time t may be associated with a motor command 340 issued at time t−1. In one or more implementations, the motor command 340 may comprise "pan right" instructions to the camera 1166 motor controller. An object may be present in the camera 1166 field of view. The (prior) frame 330 at time t−1 may comprise object representation 332 obtained prior to the commencement of the action 340. The current frame 334 may comprise object representation 336 obtained based on the action 340. The predictor 212 of the apparatus 220 in FIG. 2 may predict location of the object 338 in a subsequent frame 342 at time (t+1).

In one or more implementations, the frames 330, 334, 342 in FIG. 3A may correspond to frames of pixels obtained, e.g., by a camera observing an object moving independent of the camera. The motor command 340 may comprise an estimate of the object motion at time t obtained, e.g., based on the frames 334, 340.

Returning now to FIG. 2, the module 214 of the apparatus 220 may be configured to evaluate output 218 of the forward model prediction module 212. The evaluation employed by the module 214 may be based on the teaching input 204. In some implementations, the teaching input 204 may comprise a reference location of the object 338 at time (t+1). In one or more implementations, the teaching input 204 may comprise an observed sensory outcome of the action 206, e.g., appearance of target/objects due to motion of a robotic platform. The teaching input may be determined based on observing the result of performing the action 206. The input 206 may be delayed with respect to the input 202. In some implementations, the predictor may delay the update until teaching the signal 204 may become is available.

The evaluation may comprise a comparison, a difference, a correlation, and/or other operation, aimed at estimating similarity or discrepancy, e.g., between the reference and the predicted object location. The output of the evaluation module 214 may be provided to the predictor module 212 via a feedback pathway 216.

The apparatus 220 may provide the evaluation output and/or the predicted output via pathways 224, 222, respectively. The predicted output 222 may be utilized by, e.g., a motion control module for planning motion of the robotic platform. In one or more implementations, prediction of an object proximate to the frame edge may be used to stop the panning camera movement. In some implementations, predicted object position in a path of a rover may be used to alter rover trajectory.

The evaluation module 214 output 224 may indicate a level of confidence in the operation of the apparatus 220. In some implementations, the output 224 may be referred to as a novelty or discrepancy indication. By way of a non-limiting example, the apparatus 220 may be trained to predict appearance of the object 332 in one or more subsequent frames (e.g., 334, 342) based on the action 340. The training may comprise one or more trials. During a trial wherein the predicted output matches the teaching input (perfect prediction), the output 224 may comprise a zero signal thereby indicating that the apparatus 220 is capable of anticipating (predicting) sensory outcome of the action 206. In some implementations, for a given training trial, the training continuation output 224 may be configured based on a comparison of a current discrepancy between the actual and the predicted outcome for the given trial versus a prior discrepancy obtained from one or more prior training trials. The prior discrepancy may comprise an average of one or more prior trial discrepancy estimates. Additional training trials may or may not be executed, according to various implementations. The apparatus 220 may be subsequently trained to predict other actions.

During a training trial, wherein a mismatch may be detected between the predicted output and the teaching input (imperfect prediction), the output 224 may comprise a non-zero signal thereby indicating that additional learning trials may be utilized in order to improve prediction of the sensory outcome responsive to the action 206.

In one or more implementations, the apparatus 220 of FIG. 2 and/or 420 of FIG. 4, described in detail below, may be trained to detect one or more objects. FIG. 3B illustrates exemplary sensory input used for detection of symbols by the apparatus 220 of FIG. 2 and/or 420 of FIG. 4, according to one or more implementations.

A frame 302 in FIG. 3 may indicate sensory input obtained (e.g., using a digital camera, a radar, a sonar and/or another device such as described in connection with FIG. 1 above). The frame 302 may be comprised on a plurality of stream of pixels. The pixels in the frame 302 may be partitioned into one or more regions 304, 306 in FIG. 3B. The pixel regions 304, 306 may comprise one or more background pixels (e.g., open squares 312 in FIG. 3B) and one or more foreground pixels (e.g., filled squares 310 in FIG. 3B) denoting a given symbol. The pixel region 304 may comprise representation of symbol 'L', while the pixel region 306 may comprise representation of symbol 'l'.

In one or more implementations, the pixel regions 304, 306 may comprise nine pixels (e.g., three by three) that may be arranged into two portions: a center portion (e.g., the pixel 308) and a periphery portion (e.g., pixels surrounding the center and shown in the frame 316). The periphery portions 314, 316 may be provided to the adaptive apparatus 220 as the sensory input 202 in FIG. 2. The center portions 310, 308 may be provided to the adaptive apparatus 220 as the teaching input 204 in FIG. 2. The apparatus 220 may be trained to predict the center portion based on the periphery information (e.g., 314, 316 in FIG. 3B) thereby effectuating recognition of respective symbols (e.g., 'L', 'l'). Upon learning to predict a given symbol based on the periphery portion information (e.g., the symbol 'L' based on the frame 314), the apparatus 220 may use a zero signal novelty indication 224 in order to cause a different sensory and/or training input. In some implementations, the novelty indication may be used by an input control block to saccade to another pixel region (e.g., from the location 324 to the location 326) in the frame 302 in FIG. 3B so as to provide new (novel) sensory input to the apparatus 220.

In some implementations involving detecting a face value of a rolled die, the sensory input associated with rolling of the die may be characterized by a predictably random outcome (e.g., ⅙ probability of a given face). FIG. 4 illustrates an exemplary adaptive apparatus configured to learn sensory consequences of an action that may comprise a random sensory component, in accordance with one or more implementations. The apparatus 400 may be embodied within the robotic controller 120 in FIG. 1. The apparatus 400 may comprise adaptive modules 420, 430 configured to receive sensory input 402, an action indication 406. In one or more implementations, the sensory input 402 may comprise data used for solving a particular task, e.g., the input 102 described above with respect to FIG. 1. The action indication 406 may comprise one or more motor commands (e.g., roll the die).

The module 420 may be configured for discrepancy determination. The apparatus 430 may be configured to detect rate of change of novelty (e.g., curiosity). The apparatus 420 may determine an association C between a previously executed action, e.g., due to the action indication 406 occurring at time t−1 and current sensory input 402 at time t, e.g., using Eqn. 1.

The module 420 may comprise a forward model block 412 and an evaluation block 414. The forward model block 412 may produce a prediction of the sensory input that should occur at time t+1, based on the action indication at time t−1, and x(t−1), x(t) denote the sensory input at time t−1 and the current time, e.g., as described above with respect to FIG. 3A.

The module 414 of the apparatus 420 may be configured to evaluate output 418 of the forward model prediction module 412. The evaluation employed by the module 414 may be based on the teaching input 404. In some implementations, the teaching input 404 may comprise a reference location of the object 338 at time t+1 in FIG. 3A, and/or reference value of the center pixel 310 in FIG. 3B.

The evaluation may comprise a comparison, a difference, a correlation, and/or other operation aimed at estimating similarity or discrepancy, e.g., between the reference and the predicted object location. The output of the evaluation module 414 may be provided to the predictor module 412 via a feedback pathway 416.

The apparatus 420 may provide the evaluation output (also referred to as the novelty) and/or the predicted output via pathways 424, 422, respectively in FIG. 4. The predicted output 422 may be utilized by, e.g., a motion control module for planning motion of the robotic platform. In one or more implementations, prediction of an object proximate to the frame edge may be used to stop the panning camera movement. In some implementations, predicted object position in a path of a rover may be used to alter rover trajectory.

The evaluation module 414 output 424 may be used to indicate variations in the predicted output 422 as compared to the teaching input 404. In some implementations, the output 424 may be referred to as a novelty indication, e.g., as described above with respect to signal 224 of FIG. 2. In some implementations, of rolling a die, the signal 424 may comprise a non-zero value (e.g., with an average probability of ⅚) corresponding to a new face (e.g., a two) randomly appearing in lace of a previously observed face (e.g., a three) in response to the action indication 406 (e.g., roll the die). In such implementations, the signal 424 may be used by the module 430 as a teaching signal. In one or more implementations, the signal 424 may comprise a temporal average over two or more trials (e.g., multiple input frames). The temporal averaging may be configured based on a box average, running mean, weighed average, exponential average and/or other applicable methodologies.

The module 430 may be configured for novelty error determination. The module 430 may comprise a forward model block 432 and an evaluation block 434. The forward model block 432 may produce a prediction of the error that may be associated with the sensory input prediction performed by module 420 and described above.

The module 434 of the apparatus 430 may be configured to evaluate output 438 of the forward model prediction module 432 versus the teaching input 424. The evaluation of the module 434 may comprise a comparison, a difference, a correlation, and/or other operation aimed at estimating similarity or discrepancy, e.g., between the novelty (e.g., a prediction error determined in module 420) and the predicted novelty (e.g., prediction error determination from 432 reference and the predicted object location). The output of the evaluation module 434 may be provided to the predictor module 432 via a feedback pathway 436.

The apparatus 430 may provide the evaluation output (also referred to as the curiosity) and/or the predicted error output via pathways 444, 442, respectively, in FIG. 4. The predicted output 442 may be utilized by, e.g., a robotic apparatus that is operating in an environment with stochastic elements, such as a waterborne robot surrounded by ocean (e.g., stochastic wave motion), a robotic device operating in a windy environment near trees (e.g., stochastic leaf movement), and/or other naturalistic environments.

The output 444 of the evaluation module 434 may be used to indicate if training is to be continued or as to whether the characteristics of the input have been learned by the apparatus 400. In some implementations, the output 444 may be referred to as a curiosity indication, wherein nonzero curiosity may be used to indicate continuation of learning, and curiosity of zero may indicate completion of learning. During a trial wherein a mismatch may be detected between the predicted output and the teaching input (imperfect prediction), the output 444 may comprise a non-zero signal thereby indicating that additional learning trials may be utilized in order to improve prediction of the sensory outcome responsive to the action 406. In some implementations, a distinction between a zero versus a non-zero curiosity indication may be determined based on a parameterized neighborhood around zero instead of an exact value of zero.

In some implementations, for a given training trial, the signal 444 may comprise learning continuation indication. The signal 444 may be configured based on a comparison of a current discrepancy between the actual and the predicted outcome for the given trial versus a prior discrepancy obtained from one or more prior training trials. The prior discrepancy may comprise an average of one or more prior trial discrepancy estimates.

In one or more implementations, the teaching signal (e.g., 424 in FIG. 4) may represent an expected error that may be updated (not shown) based on the output 438 of the prediction module 432 of FIG. 4 The signal 436 may be utilized in order to adjust the output 438 of the prediction module 432 (e.g., the predicted error).

By way of a non-limiting example, the apparatus 400 may be trained to predict appearance of a given face of a die in one or more subsequent frames based on the action 406. During preceding trials, the module 420 has been trained to reliably recognize a given face of the die. However, due to a random nature of the die rolling, the averaged novelty indication 424 may remain non-zero (e.g., equal ⅚) thereby indicating continuation of learning. By employing the cascaded architecture shown in FIG. 4, the apparatus 400 may provide the curiosity signal indicating completion of learning as follows.

Two trials may be considered, wherein during a preceding trial, the face value of 'two' may occur. During the current trial, the face value of 'three' may occur. The sensory input 402 for the current trial may comprise a representation of a rolling die. Based on the input from the preceding trial, the module 412 may produce the signal 418 corresponding to the face value of 'two'. The teaching input 404 may comprise the current face value of 'three' so that the output 424 of the evaluation module 414 may comprise an average value of ⅚.

Based on the sensory input 402 representative of a rolling die (e.g., comprising a blurred image of a die without discernible faces), the module 432 may produce the signal 438 corresponding to the expected error of ⅚ (based on outcome of previous training trials). Based on a comparison between the teaching signal 424 (having value of ⅚) and the predicted error 438 (having value of ⅚) the module 430 may produce the curiosity indication 444 having value of 0 thereby indicating that sensory outcome of the current action 406 (e.g., roll a die) may be predicted reliably.

In some implementations, the discrepancy detection methodology described herein may be utilized in order to predict motion of objects within an environment of an adaptive device and in absence of action execution by the device. Frames 330, 334, 342 may correspond to an object (e.g., a car or a ball) moving to the left so that at time t−1 the object is in the position 332 and at time instance t the object is in the position 336. The temporal pattern 332 may not require an action on the part of the robot in order for the pattern to occur. The teaching signal may be used in order to indicate to the robot as to whether the object position prediction by the robot matches the actual position. The teaching signal may induce the robot to keep looking at the moving object, or, if the moving object was initiated by a button press, to press the button again.

Figure 5:
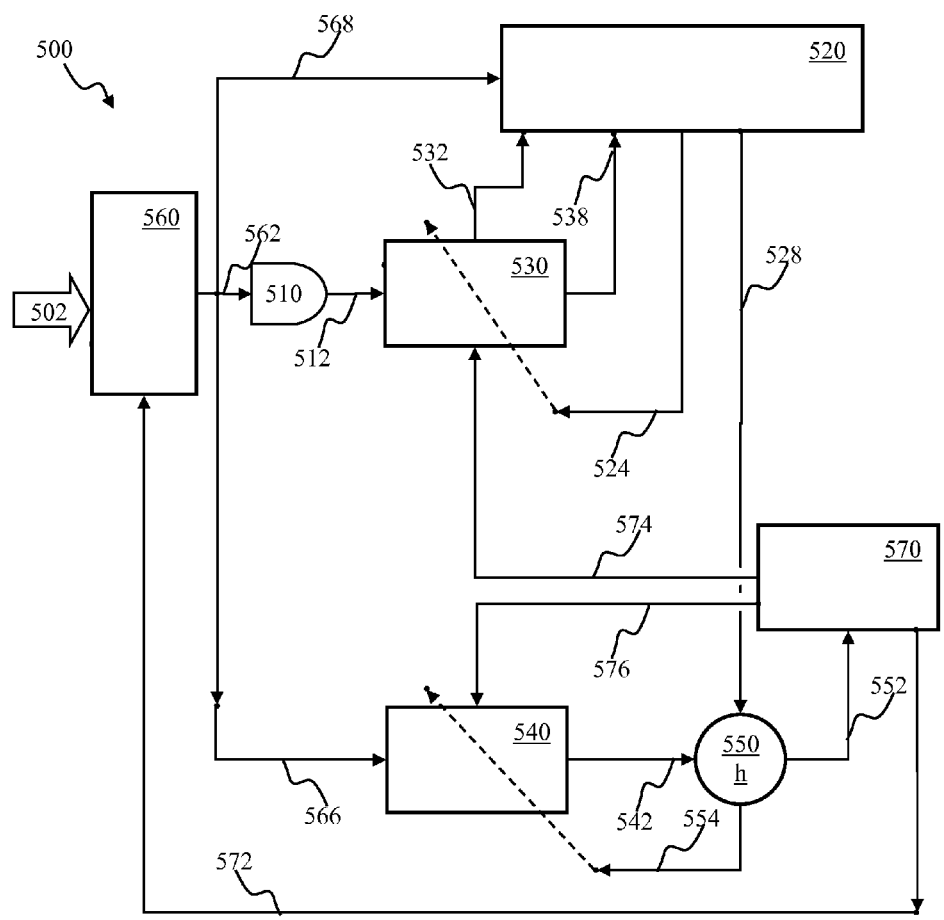
FIG. 5 is a block diagram illustrating an adaptive control system comprising adaptable predictor modules and configured to control a robotic device based on a determination of a discrepancy signal, according to one or more implementations.

FIG. 5 illustrates an adaptive control system configured to determine a discrepancy signal associated with operation of a robotic device 570, according to one or more implementations. The robotic device 570 of the system 500 may comprise a mobile platform (e.g., a rover), a manipulator arm, other controllable entities (e.g., a pan, tilt, and/or zoom camera), and/or other robotic devices. The system 500 may be configured to learn sensory consequences of one or more behaviors (actions) being performed by the robotic device 570 using the discrepancy determination methodology. Upon determining that the sensory outcome of a given action may be predicted with a target performance (e.g., as may be indicated by the discrepancy breaching a target threshold), the system may terminate learning of the action and/or commence learning of another action.

The system 500 may comprise one or more feature extractors 560. The feature extractor 560 may be configured to determine one or more targets and/or obstacles in sensory input 502 and/or features in a feedback 572 from the robotic device 570. The sensory input 502 and/or the robotic platform feedback 572 may collectively be referred to as sensory context. The detected feature information 562 may comprise one or more of object position, size, color, platform position, platform state (e.g., manipulator position, speed, torque) and/or other feature information.

The system 500 may comprise an adaptive control module 520 and one or more adaptive predictor modules (e.g., 530, 540 in FIG. 5) operable in accordance with respective learning processes (e.g., supervised learning, reinforcement learning, and/or a combination thereof) described in detail below. In some implementations, the module 520 may adaptively determine a extent of exploration space that may be excluded from exploration during learning thereby reducing learning time based on a reduced exploration space.

The adaptive predictor 530 may be configured to determine the discrepancy indication 538 that may be related to presence of novel features (novelty) in sensory outcome of an action. The predictor may receive output of the feature extractor 560 that has been delayed by a delay block 510. In some implementations wherein the sensory input 502 may comprise a plurality of frames, for a given sensory frame at time t, the delayed signal 512 may correspond to the feature extractor output $s(t-\Delta t)$ corresponding to a preceding frame. In one or more implementations, the delay time duration $\Delta t$ may be selected between one and 120 frames permitting predictions to span multiple milliseconds or seconds of operation of the robotic apparatus.

The predictor 530 may be implemented using any applicable methodologies described herein including (e.g., adaptive apparatus 200, 400 described in connection with FIGS. 2 and 4). The learning process of the adaptive predictor 530 may comprise one or more of a supervised learning process, a reinforcement learning process, a combination of supervised and reinforcement learning process, and/or other learning processes. The learning process of the adaptive predictor 530 may be configured based on a reference signal 524. In some implementations (e.g., such as described above with respect to FIG. 2), the reference signal 524 may represent actual sensory outcome (e.g., the actual position of the object 338 in FIG. 3A). The discrepancy signal 538 may be determined by the predictor 530 based on an evaluation of a predicted sensory outcome (e.g., signal 218 in FIG. 2) and the reference signal 524. In one or more implementations (e.g., such as described above with respect to FIG. 4), the reference signal 524 may represent an actual error associated with determination of the sensory outcome (e.g., average error associated with rolling of a die). The discrepancy signal 538 may be determined by the predictor 530 based on an evaluation of a predicted error (e.g., the signal 438 and the reference signal. The predicted error or predicted sensory outcome may be provided The adaptive predictor 540 may be configured to determine a predicted control signal 542 for the device 570 based on the context 566. The context may be configured based on one or more of (i) sensory input 502, (ii) the robotic platform feedback 576, and/or other information. The predictor 540 may be configured to adapt its internal parameters, e.g., according to a supervised learning rule, reinforcement learning rule, machine learning rules, and/or a combination thereof, e.g., as described in detail in U.S. patent application Ser. No. 13/842, 530 entitled "ADAPTIVE PREDICTOR APPARATUS AND METHODS", filed Mar. 15, 2013; U.S. patent application Ser. No. 13/842,562 entitled "ADAPTIVE PREDICTOR APPARATUS AND METHODS FOR ROBOTIC CONTROL", filed Mar. 15, 2013, incorporated supra. The control module 520, the predictor 540, and a combiner 550 may cooperate to produce a control signal 552 for the robotic device 570. In one or more implementations, the control signal 570 may comprise one or more motor commands (e.g., pan camera to the right, turn right wheel forward), sensor acquisition parameters (e.g., increase camera resolution, increase contrast, adjust aperture size, and/or focal length), and/or other parameters.

At a given time t, output s(t) 562, 568 of the feature extractor 560 may be provided to the predictor 540 and/or the control module 520 via a respective pathway. The control module 520 may be configured to determine a control signal 528 based on one or more of the sensory input, 502 robotic device feedback 572, the discrepancy signal 538, and/or other information. In some implementations, the robotic platform feedback may comprise proprioceptive signals, such as the readings from servo motors, joint position, torque, and/or other proprioceptive signals. In some implementations, the sensory input 502 may correspond to the controller sensory input 102, described with respect to FIG. 1, supra. In one or more implementations, the control module may interface to a human trainer, communicating with the system 500 via a remote controller and/or joystick. In one or more implementations, the control module may comprise a computerized agent such as a multifunction adaptive controller operable using reinforcement and/or unsupervised learning and capable of training other robotic devices for one and/or multiple tasks.

The context 566 may be utilized by the predictor 522 in order to produce the predicted output 542. By way of a non-limiting illustration of obstacle avoidance by an autonomous rover, an image of an obstacle (e.g., wall representation in the sensory input 502) may be combined with rover motion (e.g., speed and/or direction) to provide Context_A. When the Context_A is encountered, the control output 542 may comprise one or more commands configured to avoid a collision between the rover and the obstacle. Based on one or more prior encounters of the Context_A—avoidance control output, the predictor may build an association between these events as described in detail below.

The combiner 550 may implement a transfer function h( ) configured to combine the control signal 528 and the predicted control signal 542. In some implementations, the combiner 550 operation may be expressed as described in detail in U.S. patent application Ser. No. 13/842,530 entitled "ADAPTIVE PREDICTOR APPARATUS AND METHODS", filed Mar. 15, 2013, as follows:

$$\hat{u} = h(u, u^P). \tag{Eqn. 2}$$

Various realization of the transfer function of Eqn. 2 may be utilized. In some implementations, the transfer function may comprise addition operation, union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u} = h(u, u^P) = h(u^P, u). \tag{Eqn. 3}$$

In one or more implementations, the transfer function of the combiner 550 may be configured as follows:

$$h(0, u^P) = u^P. \tag{Eqn. 4}$$

In one or more implementations, the transfer function h may be configured as:

$$h(u, 0) = u. \tag{Eqn. 5}$$

In some implementations, the transfer function h may be configured as a combination of realizations of Eqn. 4-Eqn. 5 as:

$$h(0, u^P) = u^P, \text{ and } h(u, 0) = u, \tag{Eqn. 6}$$

In one exemplary implementation, the transfer function satisfying Eqn. 6 may be expressed as:

$$h(u, u^P) = (1-u) \times (1-u^P) - 1. \tag{Eqn. 7}$$

In one such realization, the combiner transfer function configured according to Eqn. 4-Eqn. 7, thereby implementing an additive feedback. In other words, output of the predictor (e.g., 540) may be additively combined with the control signal (528) and the combined signal 552 may be used as the teaching input (554) for the predictor. In some implementations (not shown), the combined signal 552 may be utilized as an input (context) signal 566 into the predictor 540.

In some implementations, the combiner transfer function may be characterized by a delay expressed as:

$$\hat{u}(t_{i+1}) = h(u(t_i), u^P(t_i)). \tag{Eqn. 8}$$

In Eqn. 8, $\hat{u}(t_{i+1})$ denotes combined output (e.g., 552 in FIG. 5) at time $t+\Delta t$. As used herein, symbol $t_N$ may be used to refer to a time instance associated with individual controller update events (e.g., as expressed by Eqn. 8), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity $\Delta t$ may be configured to be between 1 ms and 1000 ms.

It will be appreciated by those skilled in the arts that various other realizations of the transfer function of the combiner 550 (e.g., comprising a Heaviside step function, a sigmoidal function, such as the hyperbolic tangent, Gauss error function, or logistic function, and/or a stochastic operation) may be applicable.

Operation of the predictor 540 learning process may be aided by a teaching signal 554. As shown in FIG. 5, the teaching signal 554 may comprise the output of the combiner 550:

$$u^d = \hat{u}. \quad \text{(Eqn. 9)}$$

In some implementations wherein the combiner transfer function may be characterized by a delay $\tau$ (e.g., Eqn. 8), the teaching signal at time $t_i$ may be configured based on values of u, $u^P$ at a prior time $t_{i-1}$, for example as:

$$u^d(t_i) = h(u(t_{i-1}), u^P(t_{i-1})). \quad \text{(Eqn. 10)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$:

$$u^P(t_{i+1}) = F[x_i, W(u^d(t_i))]. \quad \text{(Eqn. 11)}$$

In Eqn. 11, the function W may refer to a learning process implemented by the predictor.

In one or more implementations, such as illustrated in FIG. 5, the input 502, the teaching input 524, 554, the control signal 528, the predicted output 542, 532, the discrepancy signal 538, the combined output 552, and/or robotic platform feedback 572 may comprise spiking signal, analog signal, and/or a combination thereof. Analog to spiking and/or spiking to analog signal conversion may be effectuated using, mixed signal spiking neuron networks, such as, for example, described in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, incorporated supra.

Output 552 of the combiner, e.g., 550 in FIG. 5, may be gated. In some implementations, the gating information may be provided to the combiner by the control module 520. In one such realization of spiking controller output, the control signal 528 may comprise positive spikes indicative of a control command and configured to be combined with the predicted control signal (e.g., 542); the control signal 528 may comprise negative spikes, where the timing of the negative spikes is configured to communicate the control command, and the (negative) amplitude sign is configured to communicate the combination inhibition information to the combiner 550 so as to enable the combiner to 'ignore' the predicted control signal 542 for constructing the combined output 552.

In some implementations of spiking signal output, the combiner 550 may comprise a spiking neuron network; and the control signal 528 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 552 in FIG. 5B).

The gating information may be provided to the combiner via an interface with another entity (e.g., a human operator controlling the system with a remote control, and/or external controller) and/or via an output from the module 520 (e.g. an adapting block, or an optimal controller). In one or more implementations, the gating information may comprise one or more of: a command, a memory address of a register storing a flag, a message, an inhibitory efficacy, a value (e.g., a weight of zero to be applied to the predicted control signal 542 by the combiner), and/or other information capable of conveying gating instructions to the combiner.

The gating information may be used by the combiner network to inhibit and/or suppress the transfer function operation. The suppression (or 'veto') may cause the combiner output (e.g., 552) to be comprised solely of the control signal portion 542, e.g., configured in accordance with Eqn. 5.

In one or more implementations, the gating signal may comprise an inhibitory indication that may be configured to inhibit the output from the combiner. Zero combiner output may, in some realizations, may cause zero teaching signal (e.g., 550 in FIG. 5) to be provided to the predictor so as to signal to the predictor a discrepancy between the target action (e.g., controller output 528) and the predicted control signal (e.g., 542).

The gating signal may be used to veto predictor output 542 based on, for example, the predicted control output 542 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the robotic platform, the gating signal may cause the combiner to veto (ignore) the predictor contribution and to pass through the controller contribution.

Predicted control signal 542 and the control input 528 may be of opposite signs. In one or more implementations, positive predicted control signal may exceed the target output that may be appropriate for performance of as task. The control signal 528 may be configured to comprise negative signal (e.g., −10) in order to compensate for overprediction by the predictor.

Gating and/or sign reversal of controller output may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'overwrite' predictor output. In one or more implementations compensation for overprediction may be controlled by a graded form of the gating signal.

Figure 6:
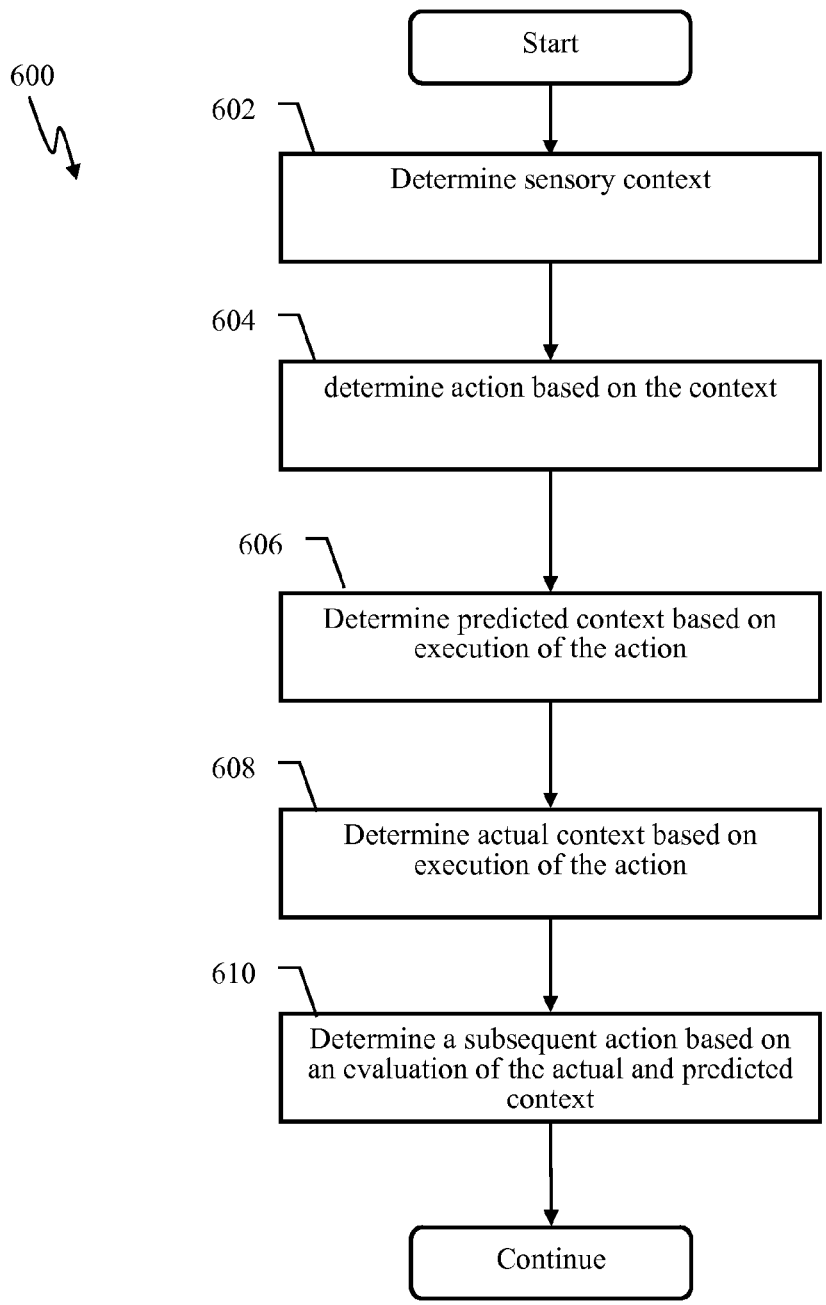
FIG. 6 is a logical flow diagram illustrating a method of determining an action based on a predicted state of a robot associated with outcome of a prior action, in accordance with one or more implementations.
Figure 7:
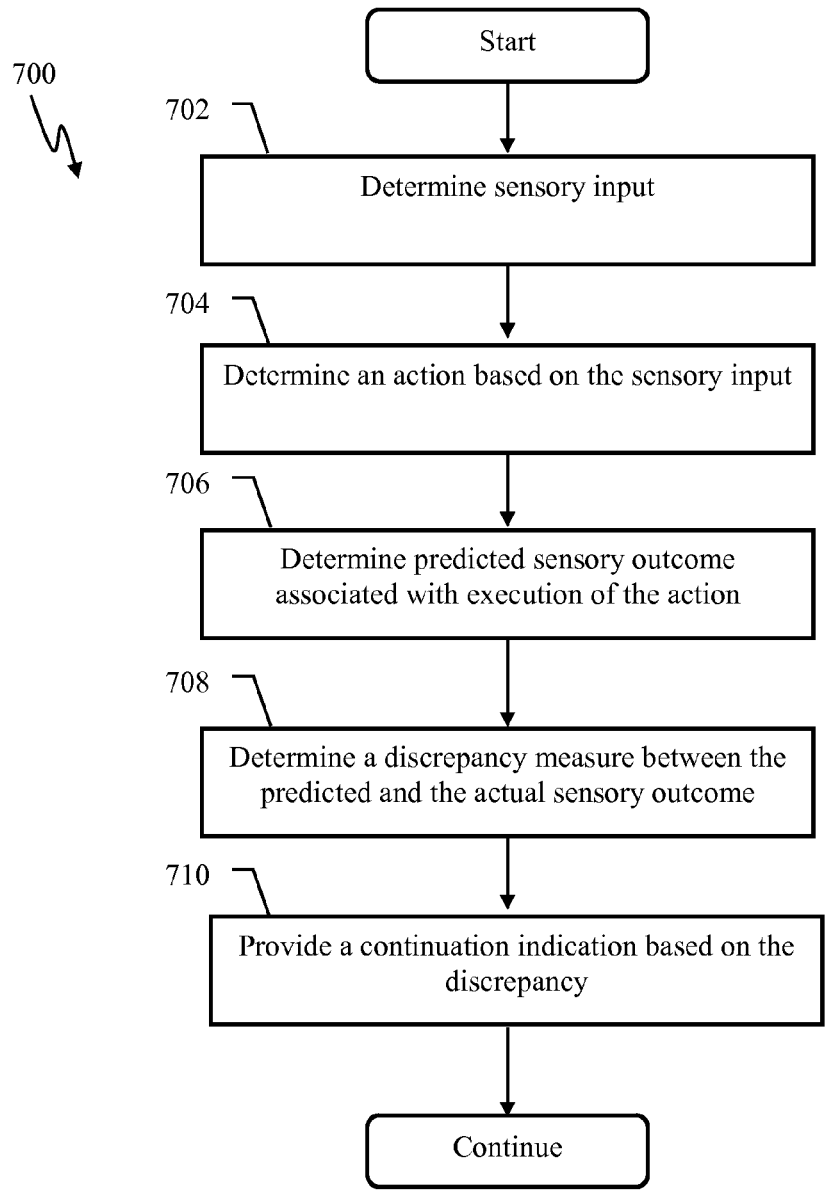
FIG. 7 is a logical flow diagram illustrating a method of determining a discrepancy indication associated with predicting sensory outcome of an action, in accordance with one or more implementations.
Figure 8:
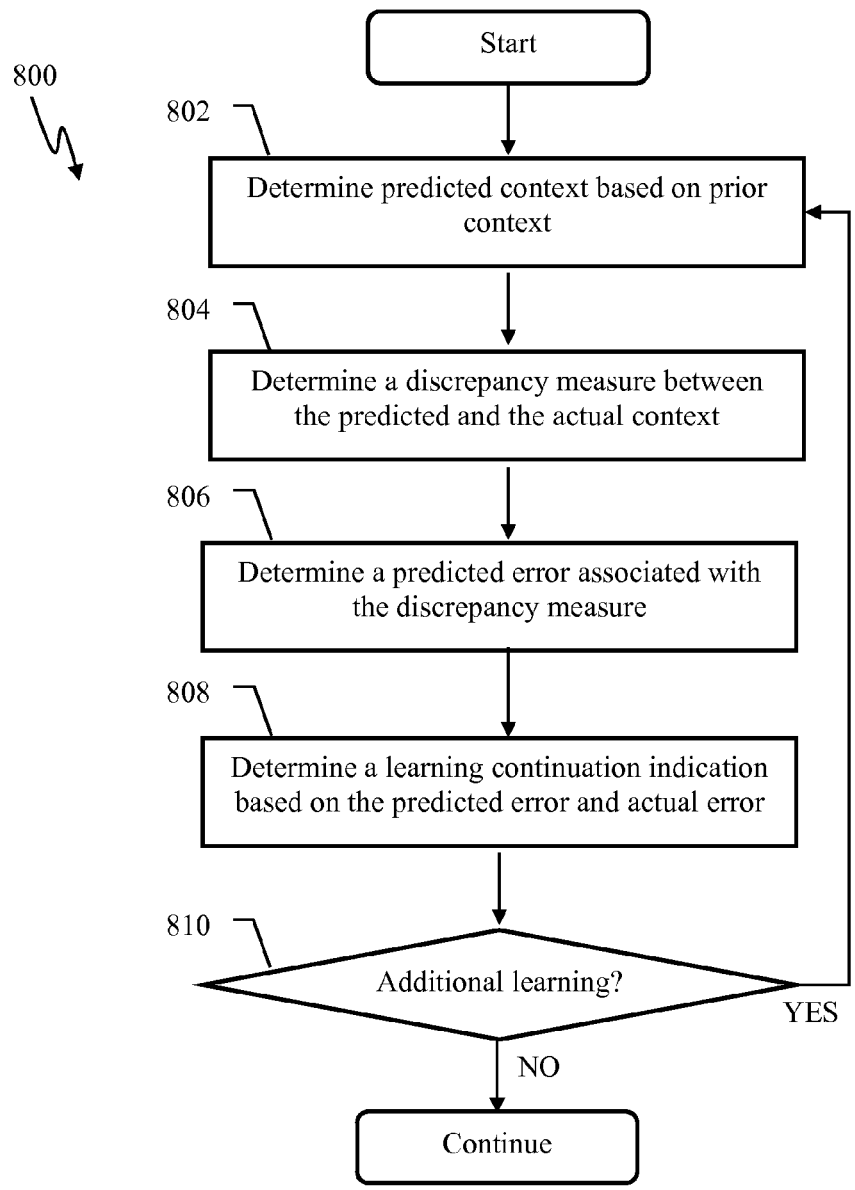
FIG. 8 is a logical flow diagram illustrating a method of determining a learning continuation signal based on a novelty indication, in accordance with one or more implementations.

FIGS. 6-8 illustrate methods of training and/or operating an adaptive arbitrator apparatus of the disclosure, in accordance with one or more implementations. The operations of methods 600, 700, 800 presented below are intended to be illustrative. In some implementations, methods 600, 700, 800 may be accomplished with one or more additional operations not described, and/or without one or more of the operations discussed. Additionally, the order in which the operations of methods 600, 700, 800 are illustrated in FIGS. 6-8 described below is not intended to be limiting.

In some implementations, methods 600, 700, 800 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 600, 700, 800 in response to instructions stored electronically on an electronic storage medium. The one or more processing devices may include one or more devices configured through hardware, firmware, and/or software to be specifically designed for execution of one or more of the operations of methods 600, 700, 800.

FIG. 6 illustrates a method of determining an action based on a predicted state of a robot associated with outcome of a prior action, in accordance with one or more implementations. The method 600 of FIG. 6 may be performed by a controller of a robotic device e.g., 1170 of FIG.9 and/or system 500 of FIG. 5.

At operation 602 of method 600, sensory context may be determined by a controller of the robotic device. In some implementations, the context may comprise one or more spatio-temporal aspects of sensory input (e.g., 202 in FIG. 2) and/or robotic platform feedback (206 in FIG. 2), and/or features determine by the feature extractor (560 in FIG. 5). The sensory aspects may include an object being detected in the input, a location of the object, an object characteristic (color/shape), a sequence of movements (e.g., a turn), a characteristic of an environment (e.g., an apparent motion of a wall and/or other surroundings, turning a turn, approach, and/or other environmental characteristics) responsive to the movement. In some implementations, the sensory input may be received based on performing one or more training trials.

At operation 604, an action may be determined based on the context. In one or more implementations, the action may comprise one or more motor commands (e.g., move forward, turn, zoom-in, pan, and/or other motor commands), action indications (e.g., roll dice, approach, avoid, and/or other action indications), manipulator instructions (e.g., pick, release, and/or other manipulator instructions), and/or other actions. In some implementations, operation 604 may comprise determining of an action external to the controller (e.g., movement of the object between the frames 330, 334 in FIG. 3A). Action determination of operation 604 may be performed by a predictor module, e.g., 540 in FIG. 5.

At operation 606 a predicted context associated with execution of the action (produced at operation 604) may be determined. In one or more implementations, the predicted context may correspond to a position of the object in a subsequent frame (e.g., the frame 342 in FIG. 3A), effectuated by the adaptive apparatus 220 of FIG. 2. In some implementations of analyzing a processes characterized by a random parameter (e.g. die roll), the predicted context may comprise an average error associated with predicting the sensory outcome of the action. The context prediction may be effectuated by the adaptive apparatus 420, 430 of FIG. 4.

At operation 608, the actual context configured based on an execution of the action of operation 604 may be determined. In some implementations, the actual context determination may be determined based on an observed sensory outcome of the action (e.g., appearance of target and/or objects due to motion of a robotic platform, rotation of target/objects due to the motion of the robotic platform, sound resulting from motion of the robotic platform or its interaction with the environment, and/or changes in illumination as a result of motion of the robotic platform).

At operation 610, a subsequent action may be determined based on an evaluation of the actual and predicted context. In some implementations wherein the predicted context does not match the actual context, the subsequent action may comprise execution of the action determined at operation 604. By way of a non-limiting illustration, the action may comprise a motor instruction to rotate a manipulator joint by 30°. The expected sensory context may comprise position of the joint rotated by 30°, a distance between a manipulator coupled to the joint and an object subsequent to the rotation of the joint by 30°, and/or other expected sensory context. The actual sensory context may comprise actual (observed) position of the joint rotated, actual distance, and/or other parameter observed subsequent to the rotation of the joint by 30°. Upon determining that discrepancy between the predicted and the actual joint position is outside a target range (e.g., greater than zero), the 30° joint rotation action may be executed again in order, e.g., to obtain a better a prediction of the outcome. When the discrepancy is within the target range (e.g., less than 5% according to a specified threshold), the 30° joint rotation action may be considered as learned with a sufficient performance and training of other actions may commence.

FIG. 7 illustrates a method of determining a discrepancy indication associated with predicting sensory outcome of an action, in accordance with one or more implementations.

At operation 702 of method 700, sensory input may be determined. In some implementations, the sensory input may comprise one or more objects or features present within the robot's environment (e.g., provided to the robot via the input 202 in FIG. 2), characteristic of feedback in robot feedback (e.g., 206 in FIG. 2), and/or other sensor input. In some implementations, the sensory input may be received based on performing one or more training trials.

At operation 704, an action may be determined in accordance with the input. In one or more implementations, the action may comprise one or more motor commands (e.g., move forward, turn, zoom-in, pan, and/or other motor commands), action indications (e.g., roll a dice, approach, avoid, and/or other action indications), manipulator instructions (e.g., pick, release, and/or other manipulator instructions), and/or other actions. In some implementations, operation 704 may comprise determining of an action external to the controller, e.g., movement of the object between the frames 330, 334 in FIG. 3A. Action determination of operation 704 may be performed by a predictor module, e.g., 540 in FIG. 5.

At operation 706, a predicted sensory outcome associated with execution of the action (produced at operation 704) may be determined. In one or more implementations, the predicted sensory outcome may correspond to a position of the object in a subsequent frame (e.g., the frame 342 in FIG. 3A), rotation of target/objects due to the motion of the robotic platform, sound resulting from motion of the robotic platform or its interaction with the environment, or changes in illumination as a result of motion of the robotic platform, effectuated by the adaptive apparatus 220 of FIG. 2. In some implementations of analyzing a processes characterized by a random parameter (e.g. die roll), the predicted sensory outcome may comprise an average error associated with predicting the sensory outcome of the action. The sensory outcome prediction may be effectuated by the adaptive apparatus 420, 430 of FIG. 4.

At operation 708, a discrepancy measure between the predicted and the actual sensory outcome may be determined. In some implementations, the discrepancy determination may comprise a comparison, a difference, a correlation, and/or other operation, aimed at estimating similarity or discrepancy, e.g., between the observed and the predicted object 338 location in frame 342.

At operation 710, a learning continuation indication configured based on the discrepancy measure may be provided. In some implementations, the learning continuation indication may comprise signal 224 and/or 444 of FIGS. 2, 4 and may be utilized in order to indicate as to whether a given behavior (as characterized by an ability of the controller to predict sensory outcome of an action configured based on the controller output) has been learned with a target accuracy or addition learning trials may be conducted in order to improve learning performance. In some implementations of classification, the learning continuation indication may be utilized by a classification process in order to determine when a particular object may be detected in the sensory input with target accuracy.

FIG. 8 illustrates a method of determining a learning continuation signal based on a novelty indication, in accordance with one or more implementations.

At operation 802 of method 800, illustrated in FIG. 8 a predicted context may be determined based on a prior context. In one or more implementations, the prior context may comprise one or more of sensory prior input (e.g., 202 in FIG. 2, frames 330, 334 in FIG. 3A), characteristics identified in the sensory input (e.g., motion of the object 332 to location 336 in FIG. 3A, periphery portions 314, 416 in FIG. 3B), a motor command and/or action indication (e.g., 206 in FIG. 2), state of the robotic platform (e.g., as state determined using the feedback 112 in FIG. 1), and/or other prior context.

At operation 804, a discrepancy measure between the predicted and the actual context may be determined. In some implementations, the discrepancy determination may comprise a comparison, a difference, a correlation, a test for particular parameterized distribution (e.g., a normality test), and or other operation, aimed at estimating similarity or discrepancy between, e.g., the observed and the predicted object 338 location in frame 342 and/or predicted and observed outcome of die roll (e.g., indicated by the signal 424 in FIG. 4).

At operation 806, a predicted error associated with the discrepancy measure of operation 804 may be determined. In some implementations, the predicted error may comprise an expected error 438 associated with an outcome of a die roll as described in detail with respect to FIG. 4.

At operation 808, a learning continuation indication may be determined. The learning continuation indication may be configured based on an evaluation of the predicted error and observed error. The observed error may comprise an average of the discrepancy determined at operation 804 and may be provided via a teaching signal to learning process of operation 808.

At operation 810, a determination may be made as to whether additional learning is to be performed. In some implementations, the determination of operation 810 may be configured based on the learning continuation indication determined at operation 808. The learning continuation indication may be configured as zero value based on a match between the predicted and the observed error thereby conveying information that further learning may not be required. The learning continuation indication may be configured as non-zero value based on a discrepancy between the predicted and the observed error thereby conveying information that further learning may be performed. Responsive to a determination that additional learning is to be performed (e.g. based on a non-zero learning continuation indication) the method may proceed to operation 802. It will be appreciated by those skilled in the art that other implementations of learning control may be implemented using, e.g., a zero value indication for continuation of learning and a non-zero value indication for completion of learning, and/or other configurations (e.g., values of 0.5/1, −1/1, encoded using, phase, frequency, pulse width, pulse position, pulse interval, pulse number, amplitude modulation, and/or other approaches).

Figure 9:
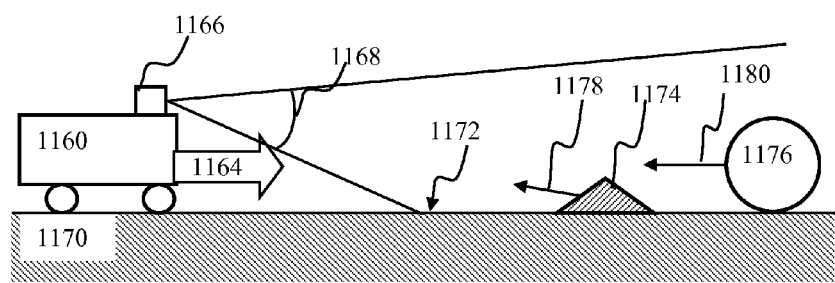
FIG. 9 is a graphical illustration depicting robotic apparatus comprising an adaptive controller apparatus of the disclosure configured for obstacle avoidance, in accordance with one or more implementations.

FIG. 9 illustrates a mobile robotic apparatus that may comprise an adaptive controller (e.g., the controller 200 of FIG. 2 or system 400 of FIG. 4). The robotic apparatus 1160 may comprise a camera 1166. The camera 1166 may be characterized by a field of view 1168. The camera 1166 may provide information associated with objects within the field of view. In some implementations, the camera 1166 may provide frames of pixels conveying luminance, refreshed at 25 Hz frame rate.

One or more objects (e.g., an obstacle 1174, a target 1176, and/or other objects) may be present in the camera field of view. The motion of the objects may result in a displacement of pixels representing the objects within successive frames, such as described in co-owned and co-pending U.S. patent application Ser. No. 13/689,717, entitled "APPARATUS AND METHODS FOR OBJECT DETECTION VIA OPTICAL FLOW CANCELLATION", filed Nov. 29, 2012, incorporated, supra.

When the robotic apparatus 1160 is in motion, such as shown by arrow 1164 in FIG. 9, the optical flow estimated from the image data may comprise the self-motion component and the object motion component. By way of a non-limiting example, the optical flow measured by the rover of FIG. 9 may comprise one or more of (i) self-motion components of the stationary object 1178 and the boundary (e.g., the component 1172 associated with the floor boundary); (ii) component 1180 associated with the moving objects 1176 that comprises a superposition of the optical flow components due to the object displacement and displacement of the robotic apparatus, and/or other components. In one or more implementations, the robotic apparatus 1160 may be trained to avoid obstacles (e.g., 1174) and/or approach targets (e.g., 1176) using collaborative learning methodology described in, e.g., U.S. patent application Ser. No. 13/953,595 entitled "APPARATUS AND METHODS FOR TRAINING AND CONTROL OF ROBOTIC DEVICES", filed Jul. 29, 2013, incorporated supra.

Various exemplary computerized apparatus may be utilized with the robotic training methodology of the disclosure. In some implementations, the robotic apparatus may comprise one or more processors configured to execute the adaptation methodology described herein. In some implementations, an external processing entity (e.g., a cloud service, computer station and/or cluster) may be utilized in order to perform computations during training of the robot (e.g., operations of methods 600, 700, 800).

Robotic training and control methodology described herein may advantageously enable execution of complex tasks by a robotic device. In some implementations, training of the robot may be based on a collaborative training approach wherein the robot and the user collaborate on performing a task, e.g., as described in detail in U.S. patent application Ser. No. 13/953,595 entitled "APPARATUS AND METHODS FOR TRAINING AND CONTROL OF ROBOTIC DEVICES", filed Jul. 29, 2013, incorporated supra. Initially, a user may guide (demonstrate) to a robot the target task.

In one or more implementations of adaptive controllers, the discrepancy-guided learning approach described herein, may advantageously accelerate learning, improve generalization of controller actions to new context(s), and/or offer ability to prioritize exploration for further learning. For example a new context may comprise a particular combination of visible target and obstacle locations that had not been previously observed/learned by the controller. The proposed discrepancy-guided learning mechanism may allow the robot to explore only novel or unexpected aspects of the environment until they can be predicted. The ability to adequately predict portions of the environment may accelerate control for the robotic device if its actions are intended to gain control over some non-predictable portion of the environment. For example, a ball bouncing erratically in an environment (e.g., a room) might not be predictable by the robot and therefore engage the robotic platform to approach the ball, whereas other objects in the environment that are expected and predictable might not attract the focus of the robotic device. In this way, the mechanisms described herein allow robotic devices to more quickly learn or "generalize" in conditions wherein some smaller portion of the environment is novel, and then quickly apply the appropriate control action for the stimulus that had been previously learned separately.

Faster learning may be achieved based on restricting the state-space wherein predictors may be learning input/output associations. The approach described herein may restrict the size of the state space (i.e., the range of training contexts), reducing the resources required for the multiple predicted signals. Reducing training space size and dimensionality may facilitate the predictor adaptation to new (e.g., previously unobserved) contexts thereby improved prediction generalization.

Generalization may be attained by providing an input to the predictor wherein there exists a previously determined mapping between predictor input/output. In some implementations, such generalization mechanism may be based on a suppression of some of the inputs that may not be germane to execution of a target task. By way of an illustration of obstacle avoidance and/or target approach, when the target task may comprise an obstacle avoidance action, suppressing representation of a target in the sensory input to the obstacle avoidance predictor, may reduce exploration space so as to narrow number of input//output combinations that may be sampled by the obstacle avoidance predictor during learning. By limiting the sensory input to the position of the obstacle, a generalization may be obtained for a variety of position of the target.

Discrepancy-guided learning methodology of the present disclosure may facilitate multitask training (e.g., multiple combinations of simultaneous target and object representations) by directing learning only towards those parts of a problem that are not yet learned or predicted. Eliminating the need for a externally-mediated (e.g., robot operator) separation of target and object representations or training environments, the demands on the predictor mechanisms may be simplified thereby reducing the overall controller complexity, size and/or cost, and/or increasing overall applicability.

In some implementations, control by the discrepancy-guided learning of sensory context input into the predictor may enable filtering out of irrelevant (e.g., not target) state indication from input into the predictor thereby enabling faster learning and/or generalization of predictor learning.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A robotic apparatus, comprising:
   a platform comprising a controllable actuator;
   a sensor module configured to provide environmental information associated with an environment of the platform; and
   a controller configured to:
      provide a control instruction for the controllable actuator, the control instruction configured to cause the platform to execute an action to accomplish a target task in accordance with the environmental information;
      determine a predicted outcome of the action;
      determine a discrepancy signal based on an actual outcome of the action and the predicted outcome; and
      determine a repeat indication responsive to the discrepancy being within a range of a target value associated with the target task;
   wherein the repeat indication is configured to cause the robot to execute a second action to achieve the target task.

2. The apparatus of claim 1, wherein:
   the target task is associated with an object within the environment; and
   the environmental information comprises sensory input characterizing one or more of a size, position, shape, or color of the object.

3. The apparatus of claim 1, wherein:
   the predicted outcome and the actual outcome comprise a characteristic of at least one of the platform and the environment; and
   the actual outcome is determined based on an output of the sensor module obtained subsequent to the execution of the action.

4. The apparatus of claim 3, wherein the characteristic is selected from a group consisting of a position of the platform, a position of an object within the environment, and a distance measure between the object and the platform.

5. The apparatus of claim 3, wherein the characteristic comprises a parameter associated with the controllable actuator, the parameter being selected from a group consisting of an actuator displacement, a torque, a force, a rotation rate, and a current draw.

6. A method of training an adaptive robotic apparatus, the method comprising:
   for a given training trial:
      causing the apparatus to execute an action based on a context;
      determining a current discrepancy between a target outcome of the action and a predicted outcome of the action;
      comparing the current discrepancy to a prior discrepancy, the prior discrepancy being determined based on a prior observed outcome of the action and a prior predicted outcome of the action determined at a prior trial; and
      providing an indication responsive to the current discrepancy being smaller than the prior discrepancy, the indication being configured to cause the apparatus to execute the action based on the context during a trial subsequent to the given trial.

7. The method of claim 6, wherein:
the discrepancy is configured based on a difference between the actual outcome and the predicted outcome;
a repeat indication is determined based on the discrepancy being greater than zero.

8. The method of claim 7, wherein the controller is further configured to determine a stop indication based on the discrepancy being no greater than zero, the stop indication being configured to cause the adaptive robotic apparatus to execute another task.

9. The method of claim 6, wherein:
the determination of the current discrepancy is effectuated by a supervised learning process based on a teaching input; and
the teaching input comprises the target outcome.

10. The method of claim 6, wherein:
the context is determined at a first time instance associated with the given trial; and
the predicted outcome of the action is determined based on a delayed context obtained during another trial at a second time instance prior to the first time instance.

11. A non-transitory computer-readable storage medium having instructions embodied thereon, the instructions being executable by one or more processors to perform a method of adapting training of a learning apparatus, the method comprising:
determining a discrepancy between a predicted outcome and an observed outcome of an action of the learning apparatus;
determining an expected error associated with the determination of the discrepancy;
comparing the expected error to a target error associated with the determination of the discrepancy; and
providing a continue-training indication based on the expected error being smaller than the target error.

12. The storage medium of claim 11, wherein:
the observed outcome is associated with execution of the action during a trial at a first time instance; and
the continue-training indication is configured to cause execution of the action at another trial at a second time instance subsequent to the first time instance.

13. The storage medium of claim 12, wherein:
the determination of the discrepancy is effectuated based on a first supervised learning process configured based on a first teaching input; and
the first teaching input is configured to convey information related to the observed outcome of the action.

14. The storage medium of claim 13, wherein:
the determination of the expected error is effectuated based on a second supervised learning process configured based on a second teaching input; and
the second teaching input is configured to convey information related to the target error.

15. The storage medium of claim 14, wherein:
the target error is determined based on one or more trials preceding the trial; and
the method further comprises providing a cease-training indication based on the expected error being greater than or equal to the target error.

16. The storage medium of claim 15, wherein:
the execution of the action during the another trial is characterized by another expected error determination; and
the method further comprises:
adjusting the target error based on the comparison of the expected error to the target error, the adjusted target error being configured to be compared against the another expected error during the another trial.

17. The storage medium of claim 15, wherein:
the execution of the action at the first time instance is configured based on an output of a random number generator; and
the method further comprises:
determining one or more target error components associated with the one or more trials preceding the trial; and
determining the target error based on a weighted sum of the one or more target error components.

18. The storage medium of claim 13, wherein:
the first supervised learning process is further configured based on a neuron network comprising a plurality of neurons communicating via a plurality of connections;
individual connections provide an input into a given neuron, the plurality of neurons being characterized by a connection efficacy configured to affect operation of the given neuron; and
the determination of the discrepancy comprises adjusting the efficacy of one or more connections based on the first teaching signal.

19. The storage medium of claim 13, wherein:
the action is configured based on a sensory context;
the first supervised learning process is configured based on a look-up table, the look-up table comprising one or more entries, individual entries thereof corresponding to an occurrence of the sensory context, the action, and the predicted outcome; and
an association development comprises adjusting at least one of the one or more entries based on the first teaching signal.

20. The storage medium of claim 11, wherein:
the action is configured based on a sensory context;
the storage medium is embodied in a controller apparatus of a robot;
responsive to the sensory context comprising a representation of an obstacle, the action comprises an avoidance maneuver executed by the robot; and
responsive to the sensory context comprising a representation of a target, the action comprises an approach maneuver executed by the robot.

* * * * *